UNITED STATES PATENT OFFICE.

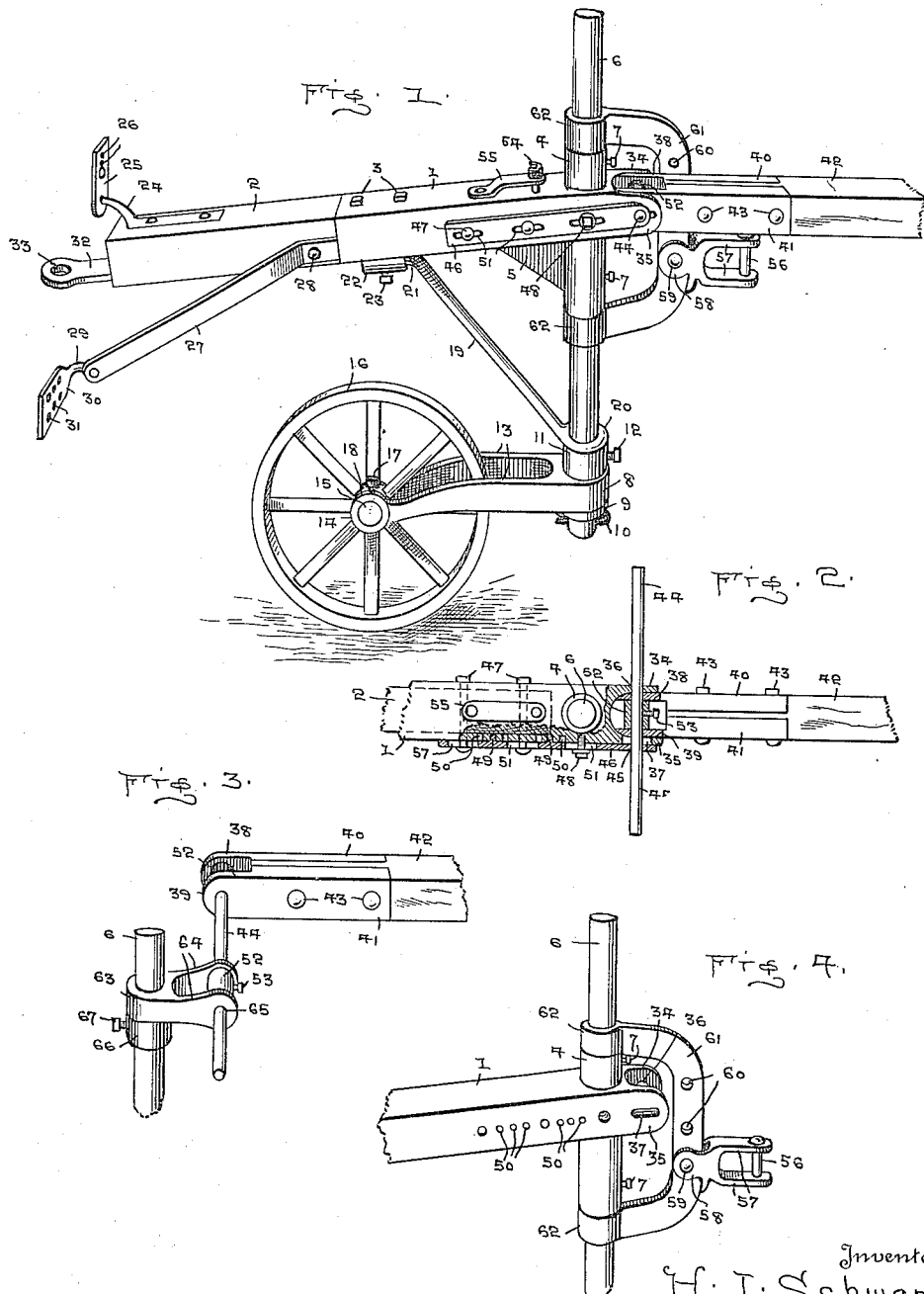

HENRY J. SCHWARTZ, OF PLAINVILLE, ILLINOIS, ASSIGNOR OF ONE-HALF TO WILLIAM T. SCHWARTZ, OF PLAINVILLE, ILLINOIS.

TONGUE-TRUCK.

1,173,147.  Specification of Letters Patent.  Patented Feb. 22, 1916.

Application filed November 30, 1914.  Serial No. 874,737.

*To all whom it may concern:*

Be it known that I, HENRY J. SCHWARTZ, a citizen of the United States, residing at Plainville, in the county of Adams and State of Illinois, have invented certain new and useful Improvements in Tongue-Trucks; and I do hereby declare the following to be a full, clear, and exact description of the invention, such as will enable others skilled in the art to which it appertains to make and use the same.

This invention relates to tongue trucks and resides in the provision of a tongue truck which may be readily attached to vehicles, farm machines, ditching machines, etc., and has for one of its objects the provision of a device for carrying the tongue and which may be readily attached to or detached from any class of machinery to which the same may be applied.

A further object of this invention resides in the provision of a tongue truck provided with means for efficiently adjusting the tongue and the draft means to compensate for any degree of side draft of the vehicle or other machines.

A still further object of this invention resides in the provision of a tongue truck provided with adjusting means for adapting the same to vehicles and machines of various heights. And a still further object of this invention resides in the provision of a tongue truck which is simple in structure, efficient and durable in purpose, and which can be manufactured and sold at a nominal cost.

Other objects and advantages of this invention will be hereinafter more clearly set forth in the specification, defined in the claims, and illustrated in the accompanying drawings, in which, Figure 1 is a side elevation of the tongue truck showing the same with a tongue connected thereto, Fig. 2 is a top plan view of the forward end of the tongue truck, partly in section and partly broken away, showing one of the means for adjusting the tongue for remedying minimum side draft, Fig. 3 is a detail perspective view, shown as partly broken away, showing means for adjustably connecting the tongue to the truck for remedying excessive side draft, and Fig. 4 is a detail perspective view, partly broken away, showing the adjusting plate of Fig. 2 and the tongue as being removed, wherein the truck may be used as a tongueless device to adapt the same for what is commonly known as tongueless disk harrows, plows, etc., and when the line of draft of the machine is true.

Referring to the drawings wherein similar reference characters denote corresponding parts throughout the several views, 1 denotes the front channel block of the tongue truck, and 2 the rear channel block telescopically mounted with the front channel block 1 and adjustably secured therein at one end through the medium of the bolts 3, and integrally formed therewith or otherwise suitably secured in the forward end of the front channel block 1 is the elongated sleeve 4, which projects through the channel block 1 and beyond the surfaces thereof, the lower portion of the sleeve 4 being provided with the angular bracing web 5 secured to the under side of the channel block 1 at the rear of the sleeve 4.

Projecting through and adjustably mounted within the sleeve 4 is the shaft 6, retained in its respective adjusted position in the sleeve 4 through the medium of the set screws 7, and swivelly mounted adjacent the lower end of the shaft 6 is the wheel trailer or caster swivel 8, secured upon the shaft 6 by the washer 9 and the cotter pin 10 at the under side thereof, and prevented from upward movement upon the shaft 6 by the collar 11 adjustably secured upon the shaft 6 by the set screw 12. The wheel trailer or caster swivel 8 is bifurcated to provide the elongated spaced trailer arms 13 provided in their free ends with the bearings 14 in which is journaled the axle 15 of the trailer or caster wheel 16. The trailer arms 13 of the caster swivel 8 are of sufficient length to accommodate wheels of different diameters, and have their bearings 14 provided with the lubricating cups 17 and the sand caps or bands 18, and for relieving the lower end of the shaft 6 of the stress exerted thereupon by the caster wheel 16 and caster swivel 8, the obliquely disposed brace rod 19 is provided, the brace rod 19 being provided with the looped or eye member 20 surrounding the shaft 6 and resting upon the collar 11 thereon, the opposite end of the brace rod 19 being provided with the angularly disposed end 21 adapted to be adjustably seated within the socket 22 formed upon the under side of the front channel block 1, the end 21 of the rod 19 being adjustably secured within the socket 22 by the set screw 23.

For securing the tongue truck to a vehicle, farm machine or implement, ditching machine, etc., the rear channel block 2 of the tongue truck has secured upon its upper side adjacent its rear end the bracket 24 having swivelly mounted upon its free end the attaching plate 25 provided with a plurality of apertures 26 through which is designed to pass bolts or other suitable means for adjustably securing the plate 25 to one part of the vehicle or machine. For bracing the tongue truck and providing additional attaching means, the obliquely disposed bar 27 is employed. This bar 27 is secured to the rear block 2 in proximity to the forward end thereof by the bolt 28, and has its opposite end apertured in which is swivelly mounted the curved neck 29 of the attaching plate 30 provided with a plurality of apertures 31 for adjustably securing the plate 30 to another part of the vehicle or machine, and should the tongue truck be attached to a vehicle or machine having a king bolt or similar part, the rear block 2 is further provided with the lug 32 provided with an enlarged aperture 33 through which the lug 32 is secured to the king bolt or similar device.

The forward end of the channel block 1 is formed to provide the spaced oppositely disposed ears 34 and 35, the ear 34 being provided with the round aperture 36 while the ear 35 is provided with the elongated slot 37, and adjustably seated between the ears 34 and 35 are the apertured ears 38 and 39 of the angle plates 40 and 41 secured upon the inner end of the tongue 42 through the medium of the bolts 43. The tongue 42 is adjustably secured to the front block 1 of the tongue truck through the medium of the bar 44 which passes through the aperture 36, the apertures in the ears 38 and 39 of the plates 40 and 41, the slot 37 in the ear 35 of the block 1, and through the circular aperture 45 in the adjusting plate 46 secured upon one side of the channel block 1 through the medium of the bolts 47 and the set screw 48. The plate 46 is provided upon its inner face with the pins or lugs 49, for engaging the plurality of alined apertures 50 formed in the adjacent portion of the channel block 1, as clearly shown in Figs. 2 and 4 of the drawings, the plate 46 being additionally provided with a plurality of elongated slots 51 through which the securing bolts 47 and the set screw 48 pass. The securing rod 44 which passes through the apertured ears 34, 35, 38 and 39 is prevented from longitudinal movement and adjustably secured within the respective ears through the medium of the adjusting and retaining collar 52 secured upon the securing rod 44 by the set screw 53, the collar 52 surrounding the rod 44 between the ears 38 and 39 of the angle plates 40 and 41 respectively of the tongue 42.

For ordinary purposes, and when the line of draft of the vehicle or machine is true, the double bar of the draft appliance may be attached to the wrench bar or dog 54 which passes through the cleat 55 and into the channel block 1, the tongue 42 being in alined position with the stub tongue or channel blocks 1 and 2 of the tongue truck, however, should there be a slight side draft either to the right or left, the bolts 47 and the set screw 48 are loosened, and the plate 46 moved forwardly until the lugs 49 engage the foremost apertures 50, this movement of the plate 46 forces the securing bar 44 slightly out of its true transverse position, the portion within the slot 37 of the plate 46 engaging the foremost end of the slot 37, thus throwing the forward end of the tongue slightly to the left of the true longitudinal line of the truck and machine, this positioning of the tongue compensates for any side draft toward the left, while upon the movement of the plate 46 to its rearmost position it will adjust the forward end of the tongue to the right of the longitudinal medial line of the truck and the machine, this movement of the tongue 42 compensating for any side draft toward the right. However, should the side draft in either direction be greater than can be conveniently compensated for by the adjustments just described, the double bar of the draft appliance is secured to the bolt 56 of the clevis 57 secured through the medium of the apertured ears 58 and the bolt 59 which is adapted to pass through one of the series of apertures 60 formed in the forward portion of the U-shaped nose iron 61, the ends of the nose iron 61 being provided with the loops 62 for embracing the shaft 6 at a point respectively above and below the sleeve 4. By the provision of the nose iron 61, and its mounting relative to the channel blocks 1 and 2 and the tongue 42, greater side draft is thereby compensated for by positioning the forward portion of the nose iron 61 at the left side or the right side of the tongue 42 to efficiently compensate for the side draft to the left or right respectively, the nose iron being shown at the left side of the tongue 42 in Fig. 1, for the sake of illustration, it being clear, of course, how the nose iron 61 would appear if placed at the right side of the tongue 42.

In the event of the side draft of the vehicle or machine being so great that either of the two above described adjusting means will not suffice to compensate therefor, the coupling 63 is employed. This coupling 63 slidably and adjustably embraces the upper portion of the shaft 6 and is provided with the spaced arms 64 having the apertures 65 formed adjacent the ends thereof through which passes the securing rod 44, similar to that shown in Fig. 2, and adjustably secured between the arms 64 through the medium of the collar 52 and the set screw 53 positioned therebetween, the tongue 42 in this instance being secured upon the end of the rod 44 through the medium of another collar 52 and set screw 53, the coupling 63 being adjustably retained in its adjusted position upon the shaft 6 through the medium of the collar 66 and its set screw 67, it being clear from the structure shown in Fig. 3 that the tongue 42 may be adjusted relative to the coupling 63 at any desired distance by loosening the set screw 53 of the collar 52 positioned between the arms 64 of the coupling 63 and sliding the rod 44 in either direction for the required distance and subsequently resecuring the same as formerly. While the tongue, in this instance, is shown at the left of the coupling 63 and the shaft 6, it is also clear, of course, that the tongue 42 may be reversed from its present position to a position at the right of the coupling 63 and the shaft 6 for compensating for extreme side draft, as the case may be.

In addition to the above means for adjusting the tongue truck to compensate for any degree of side draft, the tongue truck is capable of being adjusted for adapting the same to vehicles or machines of various heights, as well as to regulate the height of the draft appliance, and to adjust the tongue truck to accommodate the same to vehicles or machines of varying heights, the set screws 7 are manipulated for adjusting the sleeve 4 at any desired height upon the shaft 6, the end 21 of the brace rod 19 being adjusted in the socket 22, and the attaching plates 25 and 30 being swung respectively and secured to the most convenient parts of the vehicle or machine, the clevis 57 being also adjusted in the apertures 60 of the nose iron 61, and when the coupling 63, shown in Fig. 3 is used, this coupling may be adjusted upon the shaft 6 at any desired height by adjusting the bearing collar 66 upon the shaft 6.

In the view shown in Fig. 4, the tongue 42 and its connections have been omitted, as well as the adjusting plate 46, whereby the truck is capable of being used in connection with what is commonly known as a tongueless disk harrow or other machine wherein a tongue is not necessary, provided that the line of draft of the vehicle or machine is true, that is, without any side draft.

The form herein shown and described is the preferred embodiment of the invention, but the right is hereby expressly reserved to make such alterations and variations therein from time to time as it may be deemed expedient and which will neither depart from the spirit of the invention nor the scope of the claims.

Having now described my invention, what I claim as new and desire to secure by Letters-Patent, is:—

1. A tongue truck, comprising; a stub tongue consisting of a front channel block, and a rear channel block secured within the rear end of said front channel block, means for supporting said stub tongue upon a caster wheel, ears at the forward end of said front channel block, one of said ears being provided with a circular aperture, the other of said ears being provided with an elongated longitudinally extending slot, a main tongue for said stub tongue, plates secured upon the rear end of said main tongue provided with apertured ears embraced by the ears of said front channel block, a plate mounted upon said front channel block and longitudinally adjustable thereon, said plate provided with an aperture in its forward end for registering with the slot in one of the ears of said front channel block, a rod projecting through the apertures and the slot of the respective ears and plates for pivotally connecting said main tongue to said stub shaft, means for retaining said rod in operative position, and means for securing said plate in its adjusted positions upon said front channel block, whereby said plate is capable of longitudinal adjustment upon said front channel block to maintain said main tongue in the true line of draft, or to deflect said main tongue at either side of the true line of draft to compensate for side draft in either direction.

2. A tongue truck, comprising; a stub tongue consisting of a front channel block, and a rear channel block secured within the rear end of said front channel block, means upon said rear channel black for securing said stub tongue to a vehicle or machine, a sleeve within the forward end of said front channel block, a vertical shaft slidably projecting through said sleeve, a caster swivel pivotally mounted upon the lower end of said shaft, a caster wheel mounted in said swivel, set screws carried by said sleeve adapted to engage said shaft for retaining said sleeve in either raised or lowered position upon said shaft for varying the height of said truck, a main tongue pivotally connected to said stub tongue, means upon said front channel block for laterally deflecting said main tongue at either side of the true line of draft for compensating for minimum side draft, and a yoke having its ends loosely embracing said shaft at points above and below said shaft to provide means for attaching draft appliances to said truck, said yoke being adapted to be swung upon said vertical shaft for positioning the same at either side of said main tongue to compensate for excessive side draft in either direction.

In testimony whereof I have signed my name to this specification in the presence of two subscribing witnesses.

HENRY J. SCHWARTZ.

Witnesses:
W. C. COSGROVE,
JOHN B. BOHON.

Copies of this patent may be obtained for five cents each, by addressing the "Commissioner of Patents, Washington, D. C."